Figure 1:
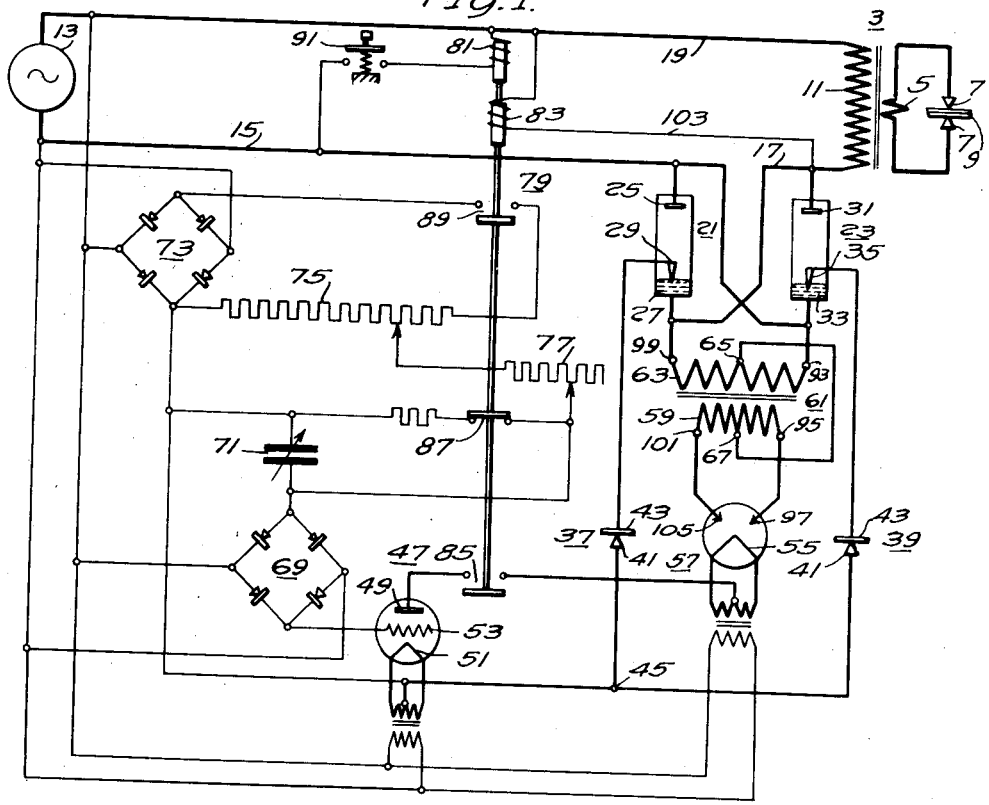

May 20, 1941.   H. DIAMOND   2,242,942
WELDING TIMER
Filed May 17, 1939

WITNESSES:

INVENTOR
Hymen Diamond.
BY
ATTORNEY

Patented May 20, 1941

2,242,942

UNITED STATES PATENT OFFICE 2,242,942

WELDING TIMER

Hymen Diamond, Pittsburgh, Pa., assignor to Westinghouse Electric & Manufacturing Company, East Pittsburgh, Pa., a corporation of Pennsylvania Application May 17, 1939, Serial No. 274,172

8 Claims. (Cl. 250—27)

My invention relates to control systems and it has particular relation to control systems utilizing electric discharge apparatus for controlling the flow of power from a source to a work circuit.

An object of my invention is to provide a system of simple structure incorporating a minimum of auxiliary discharge devices for controlling the current flow through a series of main electric discharge devices.

Another object of my invention is to provide a system of simple structure incorporating a minimum of auxiliary discharge devices for controlling current flow through a pair of main electric discharge devices of the immersed-ignition-electrode type connected in anti-parallel.

A more general object of my invention is to provide a novel circuit for controlling an electric discharge device of the immersed-ignition-electrode type.

A further object of my invention is to provide a simple, efficient, and inexpensive system for controlling the current flow from the source to the load.

An ancillary object of my invention is to provide a resistance spot and seam welding system of simple construction that shall operate reliably and efficiently.

In accordance with my invention, power is supplied to the material to be welded, or to any other load, from an alternating-current source through electric discharge devices of the arc-like type. The main discharge devices are controlled by an auxiliary discharge device of the arc-like type. When the latter is rendered conductive, current flows through the main discharge devices and the load, and when the auxiliary device is non-conductive, the current flow through the main discharge devices is interrupted. The auxiliary discharge device is rendered conductive by the application of energizing potential in its control circuit; and it is rendered non-conductive by the application in its control circuit of a potential counteracting the energizing potential.

The control system for the pair of electric discharge devices of the immersed-ignition-electrode type connected in anti-parallel is simplified in accordance with my invention by interconnecting the ignition electrodes of the discharge devices through a high impedance network made up of relatively low impedance elements and supplying ignition current to the discharge devices through the low impedance elements. In particular, the ignition electrodes are interconnected by a network comprising a pair of back-to-back rectifiers. To supply ignition current, the impedance of the network is controlled by means of the auxiliary discharge device referred to hereinabove.

Finally, I provide an auxiliary relay which opens a circuit for the auxiliary discharge device after each interval during which current is supplied and reestablishes the control circuit in its initial condition. To initiate the flow of welding current, a closing coil of the relay is connected across the source. Simultaneously with the initiation of the flow of welding current, a holding coil of the relay which is connected directly across the load becomes energized to maintain the relay in the closed position. When the main discharge devices are rendered non-conductive, the holding coil becomes deenergized and the relay is actuated to the open position. The relay remains in the open position until the initiation of a new welding operation.

The novel features that I consider characteristic of my invention are set forth with particularity in the appended claims. The invention itself, however, both as to its organization and its method of operation together with additional objects and advantages thereof, will best be understood from the following description of a specific embodiment when read in connection with the accompanying drawing in which, Figure 1 is a diagrammatic view of an embodiment of my invention, and Fig. 2 is a diagrammatic view showing a modification of my invention.

Figure 2:
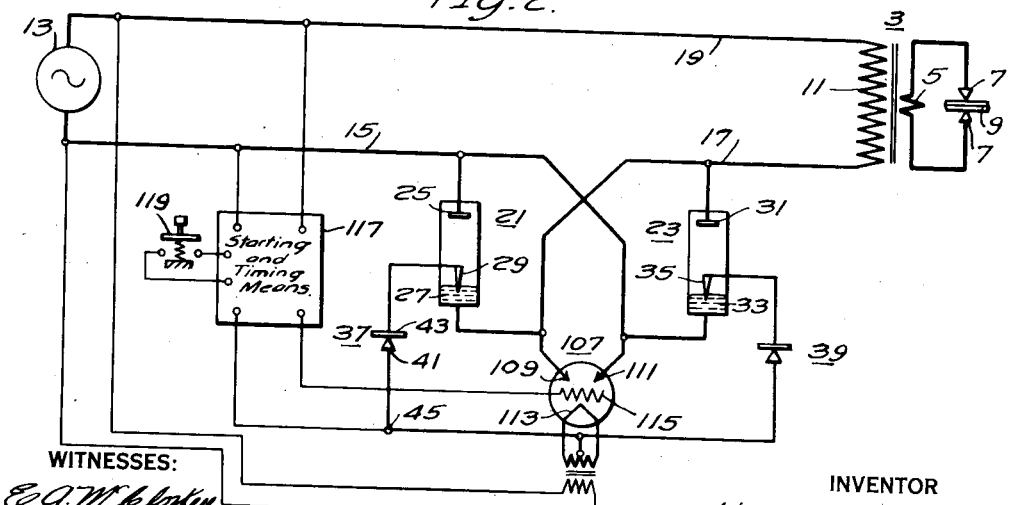

The apparatus shown in Figure 1 comprises a welding transformer 3 to the terminals of the secondary 5 of which a pair of welding electrodes 7 are connected. The electrodes 7 engage the material 9 to be welded and when current is transmitted through a primary 11 of the transformer, welding current flows through the material. The primary 11 of the transformer 3 is supplied from an alternating-current source 13 which may be of the usual 60-cycle commercial type through conductors 15, 17 and 19, and a pair of main electric discharge devices 21 and 23 connected in anti-parallel. The discharge devices 21 and 23 are preferably of the immersed-ignition electrode type. The discharge device 21 has an anode 25, a mercury-pool cathode 27 and an ignition electrode 29. Similarly, the discharge device 23 has an anode 31, a mercury-pool cathode 33 and an ignition electrode 35.

The discharge devices 21 and 23 may be replaced by grid-controlled discharge devices. In such a case a properly dimensioned resistor, and if desired, a source of biasing potential, are shunted between the control electrode and one of the principal electrodes of each such substituted grid-controlled discharge device.

The ignition electrodes 29 and 35 of the discharge devices 21 and 23 are interconnected by a pair of back-to-back rectifiers 37 and 39, each rectifier having an anode 41 and a cathode 43. Anodes 41 are connected to a common junction 45 and the cathode 43 of the rectifiers 37 and 39 are connected to starting electrodes 29 and 35 respectively. While the rectifiers 37 and 39 are preferably of the dry type, it will be understood that rectifiers of the electronic type may be utilized.

For the purpose of producing a sufficient ignition current flow to render the discharge devices 21 and 23 conductive, an auxiliary discharge device 47 is provided. The latter is preferably of the arc-like type and comprises an anode 49, a cathode 51, a control electrode 53 and a gaseous medium of suitable pressure. The cathode 51 of the auxiliary discharge device is connected to the junction 45 of the rectifiers 37 and 39. The anode 49 of the auxiliary discharge device is connected to cathode 55 of a full-wave rectifier valve 57.

If desired a circuit interrupting device associated with the control means may be connected in the anode-cathode circuit of the auxiliary discharge device 47 to control the operation thereof as hereinafter described.

The rectifier valve 57 is in turn supplied from the secondary 59 of a transformer 61, the primary 63 of which is connected between the cathodes 27 and 33 of the main discharge devices 21 and 23. The primary and secondary windings of the transformer 61 are provided with intermediate taps 65 and 67 maintained at a common potential.

To control the energization of the auxiliary discharge device 47, control potential is impressed between the control electrode 53 and the cathode 51 by means of a timer. The timing means comprises a full-wave rectifier 69 or any other suitable source of potential and a capacitor 71 connected in series between the control electrode 53 and the cathode 51. A source of unidirectional potential comprising a full-wave rectifier 73 and potentiometer 75 is connected across capacitor 71 through an adjustable resistor 77. Rectifiers 69 and 73 may be of the dry copper-copper-oxide type. An electromagnetic device or relay 79 having a closing coil 81, a holding coil 83 and a plurality of contact members 85, 87 and 89 is also provided. It will be understood that conventional starters or timers, many of which are well-known in the art, may be utilized for controlling the auxiliary discharge device 47.

To initiate a welding operation, a circuit controller 91, which is preferably manually operated and may be a foot-switch or a push-button, is closed to energize closing coil 81 to actuate relay 79 and thus open the circuit through contact members 87 and close the circuits through contact members 85 and 89. The closing of lower contact members 85 of relay 79 completes the circuit through the auxiliary discharge device 47. Because of the positive potential impressed upon control electrode 53 by the source 69, the auxiliary discharge device 47 is rendered conductive. The path of the current flow through the auxiliary discharge device 47 depends on the polarity of the potentials impressed on the transformer 61 energized by the source 13. If the right-hand terminals 93 and 95 of the primary 63 and the secondary 59, respectively, of the transformer 61 are positive, the path is through the circuit extending from the right-hand terminal 95 of the secondary 59 through the anode 97 and a cathode 55 of the rectifier 57, contact members 85 of relay 79, the anode 49 and cathode 51 of the auxiliary discharge device 47 to the junction 45. At this point the circuit is divided in two parallel paths; one extending through the rectifier 39, the ignition electrode 35 of the right-hand main discharge device 23, the associated cathode 33, the right-hand half of the primary 63 of the transformer to the mid-tap 65—67 of a primary and secondary; and the other path, through the rectifier 37, the ignition electrode 29 and cathode 27 of the left-hand cam discharge device 21, the left-hand half of primary 63 of the transformer, to the common mid-tap 65—67. The complete circuits through each of the principal paths which have just been traced include the primary 63 as well as the secondary 59 of the transformer 61 and the rectifiers 37 and 39. It happens that the polarities of the potentials impressed in the paths are such that the potential drop across the rectifiers 37 and 39 counteract the potentials of the portions of the primary 63 in each complete path, and, therefore, the net potential which is effective at any time in a complete path is the potential of the portion of the secondary 59 through which current happens to be supplied.

This will be better understood by considering an actual example. Assume that the total source potential is $2E$ and that at the instant under consideration the right-hand terminals 93 and 95 of the primary and secondary, respectively, are positive, and the left-hand terminals 99 and 101, respectively, are negative. In such a case the circuit through the ignition electrode 29 of the left-hand main discharge device 21 includes the potential $-E$ from the junction 45 through rectifier 37 and ignition electrode 29 to cathode 27, the potential $+E$ from the left-hand terminal 99 of the primary 63 to the common intermediate tap 65—67 and the potential $+E$ from the intermediate tap to the right-hand terminal 95 of the secondary 59. The net potential in this circuit is, therefore, $+E$. In the circuit of the other ignition electrode, the potentials introduced are $+E$ between the junction 45 across the rectifier 39 and ignition electrode 35 to cathode 33, the potential $-E$ between the right-hand terminal 93 of the primary 63 and the common intermediate tap 65—67 and the potential $+E$ between the common intermediate tap and the right-hand terminal 95 of the secondary. Again, the net potential is $+E$. Since the net potential in both paths is the same, the same current flows through the ignititon electrodes 29 and 35 and also through the rectifiers 37 and 39. At the instant under consideration, the anode 25 of the left-hand main discharge device 21 is positive relative to the cathode 27. Therefore, the flow of ignition current in the left-hand ignition electrode 29 causes the left-hand main discharge device 21 to be rendered conductive and current to flow through the left-hand discharge device and the primary 11 of the welding transformer. Current does not flow through the right-hand discharge device 23 because at this time the anode 31 is negative relative to its cathode 33. Holding coil 83, in parallel with primary winding 11, also becomes energized, thus maintaining relay 79 in the closed position. Closing coil 81 becomes deenergized as soon as switch 91 is released. It will be understood that the holding coil 83 may be omitted from relay 79 and a holding circuit may be established by connecting conductor 103 to the junction of switch 91 and closing coil 81. It will also be understood that the closing coil 81 may be omitted from relay 79 and utilized to actuate a second relay having two sets of normally open contact members, one set connected in parallel with contact members 85 and the second set connected in parallel with contact members 89.

When the potential of the source 13 reverses the ignition current flows through the anode 105 and cathode 55 of the rectifier 55, but otherwise substantially through the same conductors. However, at this time, anode-cathode potential of the right-hand main discharge device 23 is positive and the latter is rendered conductive. It is to be noted that as soon as one or the other of the main discharge devices 21 and 23 is rendered conductive, and this occurs immediately after the initiation of current flow through the associated ignition electrode, the primary of the transformer is short-circuited by the main discharge device and the current flow through the ignition electrodes 29 and 35 is discontinued. In this manner, power loss and other disadvantages arising from continuous current flow through the ignition electrodes is avoided.

The opening of contact members 87 opens the circuit shunting the discharge capacitor 71. The closing of the upper contact members 89 completes the circuit for energizing potentiometer 75. Thus, the capacitor 71 is gradually charged through adjustable resistor 77 and a negative bias is impressed in the circuit of the control electrode 53 to counteract the positive potential of rectifier 69. The time required for charging capacitor 71 may be varied by changing the setting of the adjustable tap of resistor 77. When the resultant potential impressed between the control electrode 53 and the cathode 51 reaches a predetermined value, the auxiliary discharge device 47 is rendered non-conductive. Thus, ignition current no longer flows through the ignition electrodes 29 and 35. The main discharge devices 21 and 23 become non-conductive and remain non-conductive. When the current flow through the welding transformer 3 is discontinued, the holding coil 83 of relay 79 is also deenergized and relay 79 is actuated to open contact members 85 and 89 and close contact members 87. The opening of contact members 89 opens the circuit through potentiometer 75. The closing of contact members 87 in parallel with the capacitor 71 completes the circuit for discharging the capacitor in preparation for the next cycle of operation. The opening of contact members 85 prevents the auxiliary discharge device 47 from being rendered conductive until the next cycle of operation is initiated by the closing of switch 91.

Should it be desirable to automatically reinitiate the cycle of operation after a predetermined time, a second timer, such as, for example, timer B shown in Fig. 149 on page 128 of Industrial Electronics by F. H. Gulliksen and E. H. Vedder, may be utilized. The primary winding of the transformer of timer B may be connected across the source 13, the contact members of relay 3, which open a circuit when the operating coil of relay 3 is deenergized, are connected in series with switch 91 and closing coil 81, and contact members of relay 4 connected in the circuit of timer B may be actuated by relay 79. The timing means for auxiliary discharge device 47 is adjusted to give the proper weld regardless of operating speed. The second timer is then adjusted to give the operator the required time to move the work. Each timer is adjustable independently of the other. The operation of the system continues so long as switch 91 is closed.

Furthermore, it will be understood that the control system may be utilized for seam welding by employing a suitable timer, such as the timer utilized in Fig. 7 of the patent to Edwin H. Vedder, Patent No. 2,111,013, dated March 15, 1938, and assigned to Westinghouse Electric & Manufacturing Company, in place of the timer shown in the drawing hereinabove described. The control circuit of this timer may be energized from source 13. The positive terminal of battery 76 is connected to cathode 51 of auxiliary discharge device 47 instead of the intermediate tap of resistor 80, and the conductor from junction of secondary winding of transformer 72 and resistor 73 is connected to control electrode 53 of discharge device 47 instead of the intermediate tap of transformer winding 79.

The auxiliary discharge device 47 and the rectifier valve 57 may be replaced by an auxiliary device 107 having a pair of anodes 109 and 111, a cathode 113 and a control electrode 115 as shown in Fig. 2. If desired, the transformer 61 may be omitted. In that event the anodes 109 and 111 are connected to cathodes 27 and 33, respectively, of the main discharge devices. The cathode 113 is connected to the junction 45 of the rectifiers 37 and 39. A starting and timing means 117 initiated by a switch 119 is utilized to impress control potential between the control electrode 115 and cathode 113. The operation of the system shown in Fig. 2 is the same as hereinabove described with reference to Fig. 1 except that when the polarity of source 13 is such that anode 25 is positive and cathode 27 is negative when the auxiliary discharge device 107 is rendered conductive, ignition current flows from energized conductor 15 through anode 111, cathode 113, rectifier 37, ignition electrode 29, cathode 27 to energized conductor 17. Current does not flow through ignition electrode 35 and rectifier 39 at this time, and discharge device 23 remains non-conductive. When the polarity of source 13 is reversed, ignition current passes through ignition electrode 35 while ignition electrode 29 is deenergized.

It is to be noted that while the discharge devices 21 and 23 are illustrated as separate valves, they may, under certain circumstances, be replaced by a single double-polarity discharge device comprising a pair of mercury-pool electrodes in each of which an ignition electrode is immersed.

I do not wish to be restricted to the specific structural details, arrangement of parts or circuit connections herein set forth, as various other modifications thereof may be effected without departing from the spirit and scope of my invention. I desire, therefore, that only such limitations shall be imposed as are indicated in the appended claims.

I claim as my invention:

1. In combination, a pair of electric discharge devices connected in anti-parallel for controlling the supply of power from a source to a work circuit, each discharge device having a plurality of principal electrodes and a control electrode, and a control network connected between the said principal electrodes and the said control electrodes, the said network comprising a pair of back-to-back rectifiers connected between the said control electrodes and means including a single discharge path connected between the common junction of the said rectifiers and the principal electrodes of said pair of discharge devices for controlling the energization of said discharge devices.

2. In combination, a pair of electric discharge devices connected in anti-parallel for controlling the supply of power from a source to a work circuit, each discharge device having an anode, a cathode, and an ignition electrode, a pair of back-to-back rectifiers connected between the ignition electrodes of the said pair of discharge devices, a transformer having a primary with terminal taps and an intermediate tap, and a secondary with terminal taps and an intermediate tap, the said intermediate taps being connected together, means connecting the terminal taps of said primary to the cathodes of said pair of discharge devices, an asymmetrically conductive auxiliary discharge device having a plurality of principal electrodes and a control electrode, means for connecting one of the principal electrodes of the said auxiliary discharge device to the common junction of the said rectifiers, full wave rectifying means connected between the other principal electrode of said auxiliary device and the terminal taps of said secondary, and means connected between the control electrode and one of the principal electrodes of said auxiliary discharge device for controlling the energization of the said pair of discharge devices.

3. In combination, a pair of main electric discharge devices connected in anti-parallel for controlling the supply of power from a source to a work circuit, each discharge device having a plurality of principal electrodes and a control electrode, and control means comprising circuit means connected between the control electrodes and the principal electrodes of said pair of discharge devices for rendering the said discharge devices conductive, the said control means also comprising a pair of back-to-back rectifiers connected between the said control electrodes of the main discharge devices and an auxiliary discharge device connected in said circuit means, said auxiliary device having a principal electrode connected to the common junction of the said back-to-back rectifiers.

4. For use in supplying an alternating current load from a source of alternating current, the combination comprising a pair of electric discharge devices of the immersed-ignition-electrode type connected in anti-parallel between said source and said load, each of said discharge devices having an anode, a cathode, and an ignition electrode immersed in said cathode, a pair of back-to-back rectifiers connected between the ignition electrodes of said discharge devices, said rectifiers having a common junction, and means for transmitting current through said rectifiers and said ignition electrodes to render said discharge devices conductive, the said means including an auxiliary discharge device having a plurality of principal electrodes, one of said principal electrodes of the auxiliary discharge device being connected to the junction of said rectifiers, and means for connecting another of said principal electrodes of said auxiliary discharge device to the principal electrodes of said pair of discharge devices.

5. For use in supplying an alternating current load from a source of alternating current, the combination comprising a pair of electric discharge devices of the immersed-ignition-electrode type connected in anti-parallel between said source and said load, each of said discharge devices having an anode, a cathode, and an ignition electrode immersed in said cathode, a pair of back-to-back rectifiers connected between the ignition electrodes, the said rectifiers having a common junction, a transformer having a primary with terminal taps and an intermediate tap, and a secondary with terminal taps and an intermediate tap, said last-named intermediate taps being connected together, means connecting the terminal taps of said primary to the cathodes of said discharge devices, an asymmetrically conductive auxiliary discharge device having a plurality of principal electrodes, means for connecting one of said principal electrodes of said auxiliary discharge device to the common junction of the said rectifiers, and means connected between the terminal taps of said secondary and said other principal electrode of said auxiliary discharge device for impressing half-waves of potential of the same polarity between the principal electrodes of said auxiliary discharge device.

6. In combination, a pair of electric discharge devices of the immersed ignition electrode type connected in anti-parallel for controlling the supply of power from a source to a work circuit, each discharge device having an anode, a cathode and a starting electrode immersed in said cathode, a pair of back-to-back rectifiers connected between the starting electrodes, the said rectifiers having a common junction, an auxiliary discharge device having a pair of principal electrodes and a control electrode, an electronic rectifier having a pair of anodes and a cathode, circuit means for connecting the anodes of said electronic rectifier to the principal electrodes of said pair of discharge devices, means for connecting one of the principal electrodes of said auxiliary discharge device to the cathode of said electronic rectifier, means for connecting the other principal electrode of said auxiliary discharge device to said common junction of said rectifiers and means connected between the control electrode and one of the principal electrodes of said auxiliary discharge device for rendering said discharge device conductive.

7. In combination, a pair of electric discharge devices of the immersed-ignition-electrode type connected in anti-parallel for controlling the supply of power from a source to a work circuit, each said device having a pair of principal electrodes and an ignition electrode immersed in said cathode, an auxiliary discharge device having a plurality of principal electrodes and a control electrode, means for connecting one of the principal electrodes only of said auxiliary device through a plurality of rectifiers to the ignition electrodes of said pair of discharge devices, means for connecting the other principal electrode of said auxiliary discharge device to certain of the principal electrodes of said pair of discharge devices, and control means connected between the control electrode and one of the principal electrodes of said auxiliary discharge device.

8. For use in supplying an alternating current load from a source of alternating current, the combination comprising a pair of main electric discharge devices of the immersed-ignition-electrode type connected in anti-parallel between said source and said load, each of said main discharge devices having an anode, a cathode and an ignition electrode immersed in said cathode, a pair of back-to-back rectifiers connected between the ignition electrodes, the said rectifiers having a common junction, an auxiliary discharge device having a pair of unheated anodes, a cathode, and a control electrode, means connecting the anodes of said auxiliary discharge device to the cathodes of said main discharge devices, means for connecting the cathode of said auxiliary discharge device to the junction of said rectifiers and means connected between the control electrode and the cathode of said auxiliary discharge device for rendering said auxiliary discharge device conductive.

HYMEN DIAMOND.